United States Patent [19]

Schreiber et al.

[11] 3,753,655

[45] Aug. 21, 1973

[54] PROCESS FOR ISOLATION AND SEPARATION OF THYROID HORMONES

[76] Inventors: Bernhard Schreiber; Gunter Knapp, both of Graz; Hans Spitzy, Herrengasse, all of Austria

[22] Filed: Nov. 9, 1971

[21] Appl. No.: 197,133

[52] U.S. Cl. ............... 23/230 B, 210/31, 260/519
[51] Int. Cl. B01d 15/08, C07c 101/72, G01n 33/16
[58] Field of Search ............... 23/230 B; 210/31, 210/37, 38; 260/519

[56] References Cited
UNITED STATES PATENTS

| | | | |
|---|---|---|---|
| 3,206,602 | 9/1965 | Eberle | 23/230 B X |
| 3,494,744 | 2/1970 | Zborowski | 23/230 B |
| 3,497,069 | 2/1970 | Lindenthal | 210/37 X |
| 3,659,104 | 4/1972 | Gross et al. | 23/230 B X |

Primary Examiner—Morris O. Wolk
Assistant Examiner—R. M. Reese
Attorney—Raymond C. Stewart, Joseph A. Kolasch

[57] ABSTRACT

A process for isolating and separating the thyroid hormones triiodothyronine and thyroxine from blood serum which comprises first isolating the hormones from the serum by means of a mixed cationic-anionic dextran ion exchanger, and then separating the hormones from each other by the use of an anionic dextran ion exchanger. This procedure permits the satisfactory removal of interfering substances from the serum without decomposing the two thyroid hormones and can be used with advantage on a small scale, for example, in a clinical diagnostic kit.

8 Claims, No Drawings

PROCESS FOR ISOLATION AND SEPARATION OF THYROID HORMONES

This invention relates to the isolation and separation of the thyroid hormones triiodothyronine ($T_3$) and thyroxine ($T_4$) from blood serum. More particularly, it relates to a process for isolating said thyroid hormones from blood serum by means of a mixed-bed ion exchanger, wherein the entire albumin and the main amount of the iodine-containing accompanying substances in the serum (for example, radiopaque agents) are separated. Subsequently, the two hormones $T_3$ and $T_4$ are separated from each other on an anion exchanger with a suitable solvent system in such a manner that the $T_4$ is bound on the anion exchanger, whereas the $T_3$ remains in the solvent system. The $T_3$, thus obtained in the pure form, is incinerated, after an enriching step with chloric acid, and the iodine liberated in this manner is catalytically determined with the aid of the cerium (IV)-arsenic(III) reaction. The $T_4$ is then eluted from the anion exchanger and, after incineration, likewise determined catalytically.

This invention makes it possible to effect a quantitative, direct chemical determination of the serum $T_3$ and of the serum $T_4$, respectively. Triiodothyronine ($T_3$), besides thyroxine ($T_4$), is a hormone having a strong metabolic or anabolic effect, the determination of which in the blood serum has heretofore been possible only indirectly with the aid of time-consuming processes. However, in the process of the present invention, $T_3$ is separated from the blood serum together with $T_4$, as well as mono- and diiodotyrosine, by means of a mixed-bed dextran ion exchanger in column form (column 1). The use of a mixed-bed exchanger having a polysaccharid base, e.g., a dextran base exhibits the following advantages as compared to the conventional processes which operate with pure anion or cation exchange resins on the basis of polystyrene:

1. A more satisfactory removal of interfering accompanying substances in the serum (for example, iodine-containing drugs, radiopaque agents, etc.).
2. The reagents employed in the novel isolating process of this invention decompose the hormones to a far lesser extent than the reagents required in the conventional processes.

The hormones $T_3$ and $T_4$ bound to the exchanger, as well as mono- and diiodotyrosine, likewise isolated from the serum, are eluted, in a small volume, with a hydrochloric acid mixture of tetrahydrofurfuryl alcohol (THFA) and water or a mixture of tetrahydrofuran (THF) and water. In order to separate $T_3$ from the thus-obtained solution, the latter is adjusted to a pH of 7.5 to 8.5, preferably 7.8–8.2, and introduced into an anion exchange column of the polysacchrid type, e.g., the dextran type (column 2). During this step, the exchanger binds only $T_4$ and diiodotyrosine, whereas $T_3$ and monoiodotyrosine are passed through. The eluants THFA-water and/or THF-water utilized in the process of this invention, usually adjusted to a pH of from 7.8 to 8.3, make it possible, in combination with an anion exchanger of dextran, to sharply separate the triiodothyronine from the thyroxine in a small eluting volume. From the thus-obtained solution of $T_3$ and monoiodotyrosine, the two compounds are enriched or concentrated by means of a cation exchange column (column 3). By washing with a borate buffer, the monoiodotyrosine is eluted from this column, whereas $T_3$ remains combined with the exchanger.

Then, the $T_3$ is eluted from column 3 with ammoniacal ethanol, the solution is concentrated by evaporation, and the residue is incinerated with chloric acid. The thus-liberated iodine is catalytically determined in a conventional manner with the cerium (IV)-arsenic(III) reaction. From the thus-measured iodine content, the $T_3$ concentration of the serum is calculated. The $T_4$ is eluted from column 2 with an acidic THF-water or an acidic THFA-water mixture. An aliquot proportion thereof is evaporated, incinerated with chloric acid, and measured analogously to $T_3$.

The separation of the hormones by means of the method of the present invention represents a great advance in the art as compared with processes known heretofore, since:

1. There is no decomposition of $T_4$ to $T_3$ during the separating procedure.
2. The exchanger columns are small and, thus, there is the possibility of making this determination commercially available in the form of a clinical diagnostic kit.
3. It is possible for one person to manually conduct approximately 20 separations simultaneously, and the process is non-critical.
4. The $T_3$ is obtained in a relatively small volume, whereby the determination procedure is simplified and a greater sensitivity is made possible.

Other exchangers of the polysaccharid type which can be used in the present invention include, for example, the ion exchange celluloses of Messrs. Whatman, Bio-Rad or Merck.

Accordingly, one of the objects of the present invention is to provide an improved procedure for isolating and separating thyroid hormones from blood serum which overcomes the disadvantages and deficiencies of the prior art methods.

Another object of the present invention is to provide a method of satisfactorily removing interfering accompanying substances from blood serum while permitting the separation of triiodothyronine and thyroxine therefrom without significantly decomposing these thyroid hormones.

A further object of the invention is to provide a procedure for isolating and separating triiodothyronine and thyroxine from blood serum which may be adapted in a small clinical diagnostic kit.

These and other objects and advantages of the present invention will become apparent to those skilled in the art from a consideration of the present specification and claims.

The following example is given merely as illustrative of the present invention and is not to be considered as limiting.

EXAMPLE

Solutions:
1. 0.2N NaOH
2. 30% THFA in water
3. 30% THFA and 1% acetic acid in water
4. 20% THFA in water
5. 3N HCl in a 20% THFA/water mixture
6. Borate buffer, pH 8, 0.2 molar borate
7. 50% Ethanol in a 2.5% aqueous ammonia solution Exchanger columns:
First column: 8 × 35 mm., filled with a mixture, swelled in solution (1), of 20% QAE "Sephadex"[(1)] ([(1)]

A strongly basic anion exchanger. QAE-Sephadex is obtained by the introduction of diethyl-2-hydroxypropyl ammonium groups into dextran gels) A 25 in the chloride form and 80% SE "Sephadex"[2] ([2] A strongly acidic cation exchanger) C 25 in the H-form.

Second column: 8 × 40 mm., filled with QAE "Sephadex" A 25 in the acetate form, swelled in solution (4).

Third column: 5 × 25 mm., filled with "Dowex"[3] ([3] Styrene polymers) 50 W × 2, swelled in water, 100–200 mesh, in the H-form.

Five milliliters of serum is diluted with 10 ml. of solution (1) and heated for 30 minutes to 40°C. Then, the solution is allowed to pass through column 1. The column is rinsed with 5 ml. of solution (1) and 5 ml. of solution (2) and then eluted with 7 ml. of solution (3). The eluate contains $T_3$, $T_4$, and mono- and diiodotyrosine.

In order to separate the compounds, the eluate is introduced, after adjustment to a pH of 7.8–8.2, to column 2. The column is rinsed with 20 ml. of solution (4). The solution exiting from column 2 during the introduction of the eluate from column 1 and the rinsing step contains $T_3$ and monoiodotyrosine. This solution is received by a column 3 fed with 2 ml. of solution (5). After the solution has passed through the column, $T_3$ and monoiodotyrosine remain bound to the enchanger in column 3. The monoiodotyrosine is now rinsed out with 3 ml. of solution (6). Thereafter, the $T_3$ can be eluted in the pure form with 6 ml. of solution (7). This eluate is concentrated by evaporation and incinerated with chloric acid. Then, the iodine is determined catalytically in accordance with the method of Knapp and Spitzy [Gunter Knapp and Hans Spitzy, *Clin. Chim. Acta*, 30 (1970), 119–128]. From the iodine content, the $T_3$ concentration in the serum is calculated.

With 10 ml. of solution (3), the thyroxine ($T_4$) is now eluted from column 2. Of this eluate, 0.5 ml. is evaporated and the residue is incinerated. The thus-liberated iodine is again determined catalytically, and the $T_4$ concentration in the serum is calculated.

The invention being thus described, it will be obvious that the same may be varied in many ways. Such variations are not to be regarded as a departure from the spirit and scope of the invention, and all such modifications as would be obvious to one skilled in the art are intended to be included herein.

It is claimed:

1. A process for the isolation and separation of the two thyroid hormones triiodothyronine and thyroxine from blood serum which comprises isolating said hormones from the serum by means of a first ion exchanger consisting of a mixed cationic-anionic dextran ion exchanger, and then separating said hormones from each other by means of a second ion exchanger 2. The process of claim 1, wherein the second ion exchanger consists of an anionic dextran ion exchanger.

3. The process of claim 1, wherein the two thyroid hormones are separated from each other by the use of an eluting solvent mixture comprising tetrahydrofurfuryl alcohol-water or tetrahydrofuran-water having a pH of from 7.5 to 8.5.

4. A process for the isolation and separation of the two thyroid hormones triiodothyronine and thyroxine from blood serum which comprises passing the serum through a mixed cationic-anionic dextran ion exchanger, eluting with a tetrahydrofurfuryl alcohol-water or tetrahydrofuran-water mixture, adjusting the pH of the obtained solution to about 7.8 to 8.2 and introducing the solution into a dextran anion exchange column to obtain a solution containing triiodothyronine and monoiodotyrosine, and separating the triiodothyronine from said monoiodotyrosine.

5. The process of claim 4, wherein the triiodothyronine is separated from the monoiodotyronsine by passing the solution obtained from said anion exchange column through a cation exchange column and eluting with a borate buffer.

6. The process of claim 4, further comprising the step of eluting thyroxine from said mixed cationic-anionic ion exchanger with an acidic tetrahydrofurfuryl alcohol-water or tetrahydrofuran-water mixture.

7. The process of claim 6, further comprising the steps of incinerating the obtained triiodothyronine and thyroxine with chloric acid and determining the resultant content of liberated iodine as a measure of the triiodothyronine and thyroxine content of the serum, respectively.

8. The process of claim 7, wherein the iodine content is measured by means of the cerium(IV)-arsenic(III) reaction.

* * * * *

UNITED STATES PATENT OFFICE
CERTIFICATE OF CORRECTION

Patent No. 3,753,655　　　　　　　　Dated August 21, 1973

Inventor(s) Bernhard Schreiber et al.

It is certified that error appears in the above-identified patent and that said Letters Patent are hereby corrected as shown below:

On the cover sheet insert --[30] Foreign Application Priority Data:

May 27, 1971　　　　Germany　　　　P 21 264 25.5 --.

Signed and sealed this 2nd day of April 1974.

(SEAL)
Attest:

EDWARD M. FLETCHER, JR.　　　　　　C. MARSHALL DANN
Attesting Officer　　　　　　　　　Commissioner of Patents